United States Patent

Gower et al.

(10) Patent No.: US 6,829,128 B2
(45) Date of Patent: Dec. 7, 2004

(54) THERMAL TRIP POWER CONTROL CIRCUIT

(75) Inventors: Stacy A. Gower, Leander, TX (US); Lois D. Mermelstein, Austin, TX (US); Ayedin Nikazm, Austin, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 340 days.

(21) Appl. No.: 10/038,570

(22) Filed: Jan. 3, 2002

(65) Prior Publication Data

US 2003/0123206 A1 Jul. 3, 2003

(51) Int. Cl.[7] ............................................. H02H 5/04
(52) U.S. Cl. ...................................... 361/103; 361/100
(58) Field of Search ................................. 361/103, 100, 361/90, 88, 18

(56) References Cited

U.S. PATENT DOCUMENTS

| | | |
|---|---|---|
| 4,392,118 A | 7/1983 | Kolb et al. ................. 337/154 |
| 5,939,872 A | 8/1999 | Dubos et al. ............... 323/367 |
| 5,996,078 A | 11/1999 | Christensen et al. ........ 713/300 |
| 6,057,751 A | 5/2000 | Hung et al. .................. 337/377 |
| 6,172,611 B1 * | 1/2001 | Hussain et al. ............. 340/584 |
| 6,496,346 B1 * | 12/2002 | Bruckner ..................... 361/103 |

OTHER PUBLICATIONS

Alan E. Brown and Matthew B. Mendelow; "Power Supply Restart Circuit;" Filed Mar. 24, 1999; U.S. patent application Ser. No.: 09/275,142; 22 pages Specification (including claims and abstract); and 4 Sheets of informal figures). Copy inclosed.

* cited by examiner

*Primary Examiner*—Stephen W. Jackson
(74) *Attorney, Agent, or Firm*—Haynes and Boone, LLP

(57) ABSTRACT

An information handling system and method are provided to control a power supply in response to an overheating condition of the processor, where the overheating condition is indicated by a THERMTRIP signal from the processor. The THERMTRIP signal is latched, and the processor is shut down.

49 Claims, 3 Drawing Sheets

THERMAL TRIP POWER CONTROL CIRCUIT

BACKGROUND

The disclosure relates generally to information handling systems and, more particularly, to a circuit technique for shutting down a system power supply in response to an overheating condition of the system processor.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In at least one embodiment, an information handling system comprises a processor having a THERMTRIP output, a power supply coupled to the processor for operating the processor, and a thermal trip power control circuit. The thermal trip power control circuit comprises a latch having a CLK input coupled to the THERMTRIP output of the processor and a CLR input coupled to a user-activated control. The thermal trip power control circuit further comprises a gate having an input coupled to the output of the latch and an output coupled to a $PS_{ON}$ input of the power supply.

At least one embodiment of a method of controlling the power supply in an information handling system having a processor and a power supply is provided. The method of controlling the power supply in response to an overheating condition o f the processor comprises receiving a THERMTRIP signal from the processor, where the THERMTRIP signal indicates a processor overheating condition. The method further comprises coupling the THERMTRIP signal to a latch circuit so that the latch circuit provides at an output a $THERMTRIP\_PS_{DIS}$ signal to the power supply so as to disable the power supply.

The foregoing is a summary and this contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this disclosure and its broader aspects. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and it's numerous objects, features, and advantages made apparent to those skilled in the art by referencing the accompanying Drawings, in which.

The use of the same reference number throughout the figures designates a like or similar element.

Figure 1:
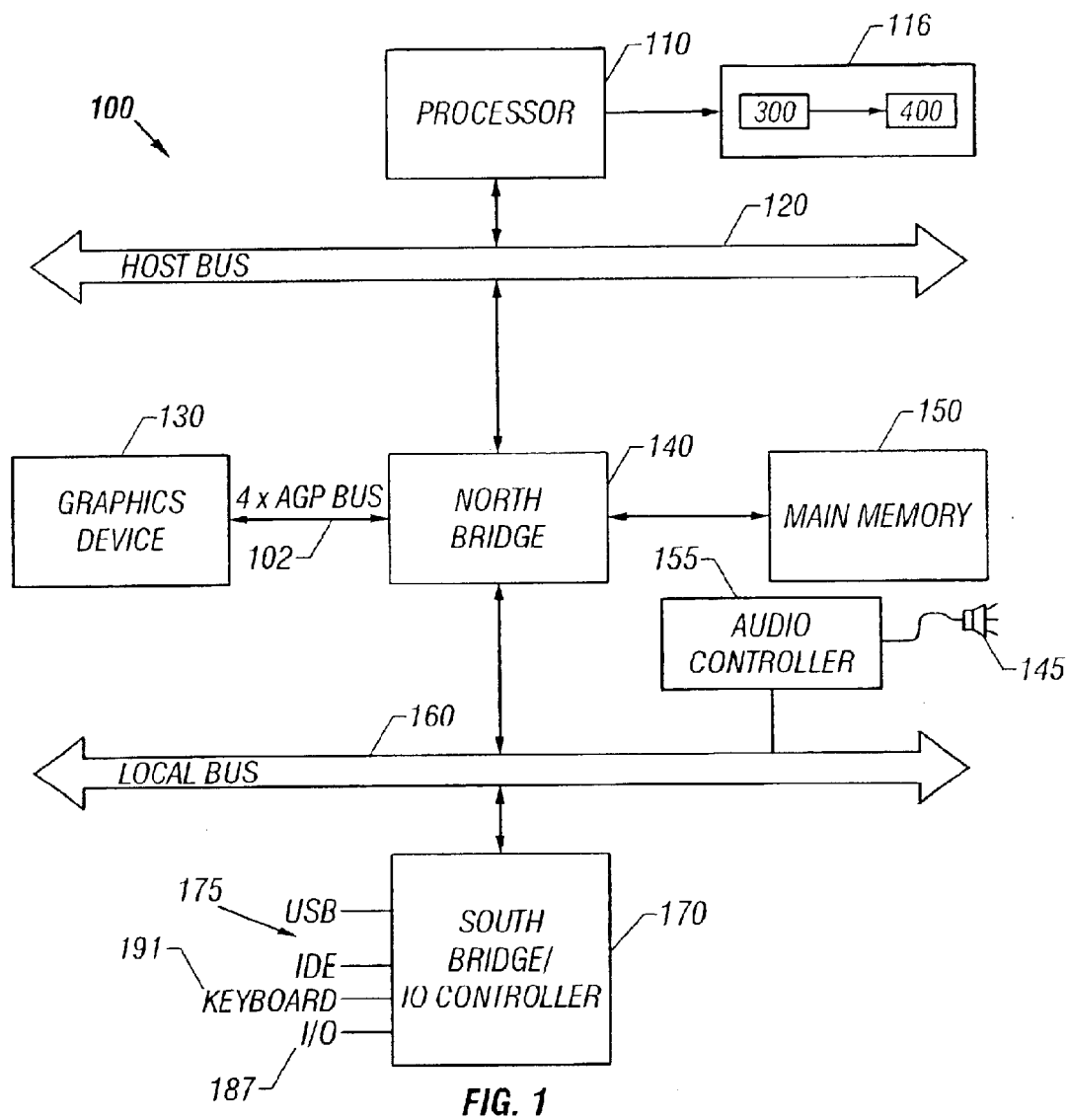
FIG. 1 is a block diagram of an information handling system.

While the disclosure is susceptible to various modifications and alternative forms, specific embodiments thereof are shown by way of example in the drawings and will herein be described in detail, it should be understood, however, that the drawings and detailed description are not intended to limit the disclosure to the particular form disclosed. On the contrary, the disclosure is to cover all modifications, equivalents, and alternatives falling within the spirit and scope of the present disclosure as defined by the appended claims.

DETAILED DESCRIPTION

The above and other objects, advantages and capabilities are achieved in one aspect of an information handling system which includes a thermal trip power control circuit operating in response to a thermal trip signal that indicates an overheating condition of a processor in the information handling system. The circuit causes the system power supply to be shut down in response to the thermal trip signal. The thermal trip signal is latched and may only be released by user intervention, so that automatic system reboot is pre-empted by the thermal trip signal, thereby avoiding an undesirable phenomenon in which the processor is repeatedly cycled between a shut-down state and a power-up state. The thermal trip power control circuit includes a latch having a data input (D) coupled to the thermal trip signal and a CLR input coupled to the user-activated PWR button. The output of the latch is ANDed with a power supply disable signal that is unrelated to the thermal condition of the processor so that the power supply is activated only when the thermal trip signal is not asserted and the power supply is not otherwise disabled.

For a thorough understanding of the subject disclosure, reference may be made to the following detailed description, including the appended claims, in connection with the above-described drawings.

FIG. 1 is a block diagram of an information handling system 100 incorporating a latch circuit 300 and power control circuit 400. In one embodiment, the information handling system 100 is a computer system. The information handling system depicted in FIG. 1 is seen to include a processor 110, associated main memory 150 and control logic, and a number of peripheral devices 130, 187, 191 that provide input and output for the system 100. Processor 110 may be, for example, an Intel Pentium™ class microprocessor or an AMD Athlon™ class microprocessor. Peripheral devices shown in FIG. 1 may include keyboards 191, graphics devices 130, and traditional I/O devices 187 that often include display monitors, mouse-type input devices, floppy and hard disk drives, CD-ROM drives, and printers.

The number and kinds of peripheral devices that are appended to personal computers continue to expand. For example, many information handling systems may also include network capability, terminal devices, modems, televisions, sound devices, voice recognition devices, electronic pen devices, and mass storage devices such as tape drives, CD-R drives, or DVDs. The peripheral devices usually communicate with the processor 110 over one or more buses 120, 160, 102, with the buses communicating with each other through the use of one or more bridges 140 and 170.

One skilled in the art will recognize that the foregoing components and devices are used as examples for sake of conceptual clarity and that various configuration modifications are common. For example, the processor 110 is used as an exemplar of any general processing unit, including but not limited to multiprocessor units; host bus 120 is used as an exemplar of any processing bus, including but not limited to multiprocessor buses; and North bridge 140 and South bridge 170 are used as exemplars of any type of bridge.

Figure 2:
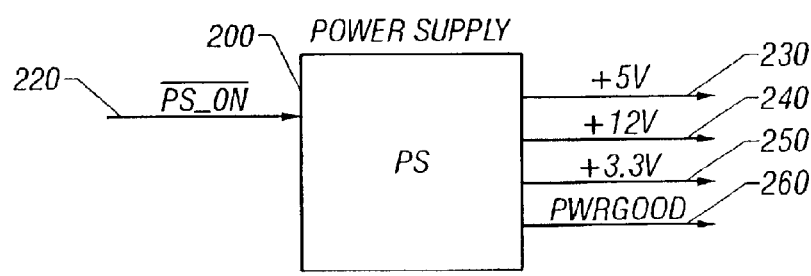
FIG. 2 is a block diagram of an exemplary power supply.

FIGS. 1 and 2 are relevant to a discussion of a typical PC power supply 200. FIG. 2 is a rendition, in block diagram form, of a conventional power supply system 200, such as may readily be used with information handling systems. Information handling systems that include one or more computer system typically include a system board to interconnect system components and peripheral devices. In a typical information handling system 100, the system board includes a power supply 200 to provide specified DC output voltages to system components and peripherals. For example, the power supply 200 in a desktop computer typically receives a power supply on (PS_ON) input 220 and distributes various DC power voltages to PC subsystems and peripherals. Typically, 3.3 VDC may be provided to a modem, 5.0 VDC to a hard drive, and 12.0 VDC to a CD-ROM drive. The plurality of DC voltage outputs at terminals 230, 240, and 250. Power supply 200 incorporates a self-test procedure. In general, if the self-test procedure indicates that the power supply performance complies with predetermined criteria, an appropriate signal indicating such compliance is caused to appear at output terminal 260.

Specifically, it is common that commercially available power supply systems undertake the self-test function during the PC start-up process. The self-test procedure is often initiated by applying a predetermined voltage to a Power Supply Enable ($PS_E$) input, or the equivalent, on the power supply. In one embodiment, the necessary voltage may be, for example, a logic-level ZERO. Power supply self-test is largely defined by the operation of a fault detector in the power supply. For the purposes of this description, it may be assumed that the fault detector measures each of the power supply output voltages to determine whether those voltages reside within respective specified predetermined ranges, ±5% being commonplace. If the observed output voltages comply with this specification, then the fault detector will issue an affirmation that no fault exists within the power supply. The affirmation may take the form of a logic-level ZERO at the output of the fault detector, but other prescribed outputs may be encountered. The output of the fault detector is routed from the power supply through a connector to the PC system board. This signal, which may be colloquially referred to as the PS Good ($PS_G$) output of the power supply, is then used to drive an indicator, usually a light-emitting diode (LED). Power supplies that operate generally as described above are commercially available from Lite-On Electronics, Inc., Milpitas, Calif. (Model #PS-520-7D) and from Delta Electronics, Taipei, Taiwan (Model # NPS-200PB-73). Activation of the LED serves as an indication that the power supply is operating, as is the entire PC. Conversely, failure of the LED to light may justify an inference that the power supply, or some other aspect of the PC, is not operative.

In this regard, state-of-the art information handling systems incorporate microprocessor 110 that may require, as a reliability feature, that operation of the PC system be discontinued if the microprocessor overheats. In order to effectuate system shut down, the microprocessor generates a THERMTRIP signal when overheating is detected. In a primitive approach, the THERMTRIP signal may be used simply to shut down the system power supply.

However, many information handling systems are designed to automatically reboot when the system processor 110 loses its power supply. During the reboot process, the system will immediately reactivate the system power supply. If the processor 110 continues in an overheating condition, the THERMTRIP signal will once again be asserted, causing the system power supply to once again shut down. The on/off cycling will continue until the processor 110 has dissipated enough heat so that the THERMTRIP signal becomes inactive, which may require an indeterminate period of time, thereby inflicting needless wear and tear on system components and giving rise to other undesirable phenomena.

Accordingly, what is desired is a technique for responding to overheating conditions of a system processor by shutting down the system power supply. The technique must reliably avoid repetitive power supply system cycling, as might occur, for example, in information handling systems that automatically reboot in response to a power supply interruption.

In a manner that will be fully described below, the disclosure, in one aspect, is a thermal trip power control circuit 116 that operates in response to an overheating condition of the system processor of a PC system. The generation of a THERMTRIP signal by the system processor 110 sets a latch that causes the system power supply to be shut down. The latched THERMTRIP signal may be reset only by user intervention so that the power supply is not enabled during the operation of an automatic reboot process that is precipitated by the power supply interruption. The technique prevents repetitive cycling of the power supply, and other system components, during the period required for the THERMTRIP signal to dissipate. The disclosure, in one embodiment, is a thermal trip power control circuit 116 that comprises a latch circuit 300, depicted in FIG. 3, coupled to a power control circuit 400, depicted in FIG. 4.

Figure 3:
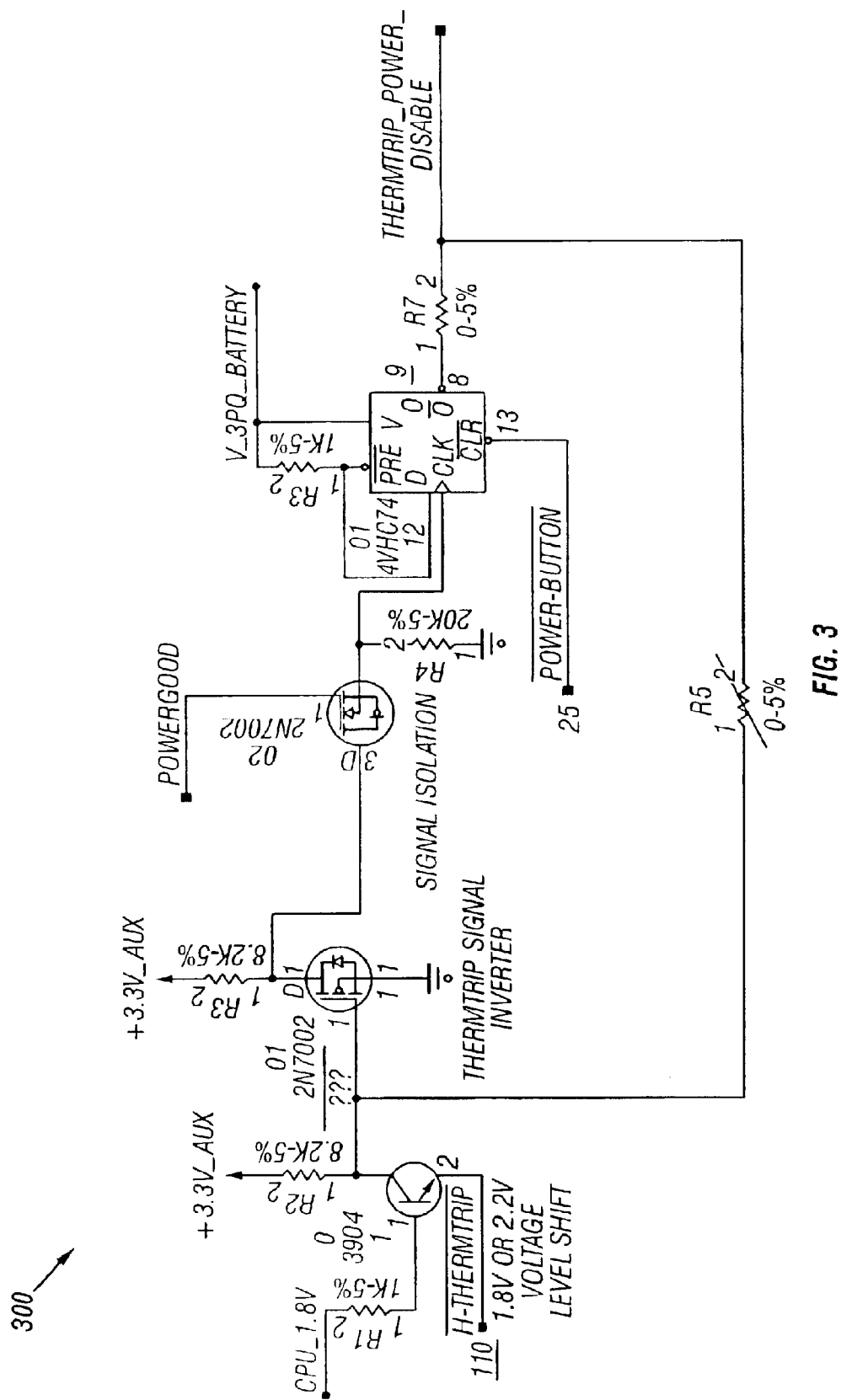
FIG. 3 is a circuit diagram of a latch circuit according to at least one embodiment.

Referring now to FIG. 3, the latch circuit 300 is seen there to include a level shifter in the form of a bipolar transistor Q1. The input of the level shifter, at Q1 emitter, is coupled to the THERMTRIP output of the system processor 110. As indicated in FIG. 3, the THERMTRIP signal generated at the system processor 110 is active when at a logic level 0. Q1 base is coupled through resistor R1 to the CPU voltage supply, which may be, for example, 1.5 Volts (V). Q1 collector is coupled through resistor R2 to the 3.30V auxiliary voltage supply. The output of the level shifter, at Q1 collector is coupled to the input of an inverter stage in the form of a dual-gate, N-channel enhancement node FET Q2.

The inverter comprises FET Q2 that has a gate electrode coupled to Q1 collector, a drain electrode coupled through resistor R3 to the 3.3V AUX voltage supply, and a source electrode coupled to circuit ground (GND). That is, Q2 drain is coupled to the input node of the isolation switch at Q3 drain. Q3 source is coupled through resistor R4 to GND. The output node of the isolation switch, at Q3 source, is coupled through resistor R4 to GND and is coupled to the clock (CLK) input of latch U1. In practice, switch Q3 will be closed when the $PS_G$ signal is a logic ZERO. Of course, when isolator switch Q3 is closed, the output of inverter Q2 is coupled to the CLK input of latch U1.

As indicated above, the CLK input of latch U1 is coupled to the output of the isolation switch at Q3 source. The preset (PRE) input of latch U1 is coupled through resistor R6 to a 3.0V battery supply. The data (D) input of latch U1 is tied to the PRE input. The clear (CLR) input of latch U1 is coupled to the user-activated POWER BUTTON, which is typically disposed on the front panel of the information handling system cabinet. The $\overline{Q}$ output of latch U1 is coupled through a resistor R7 to the input of the power control circuit 400 depicted in FIG. 4.

Figure 4:
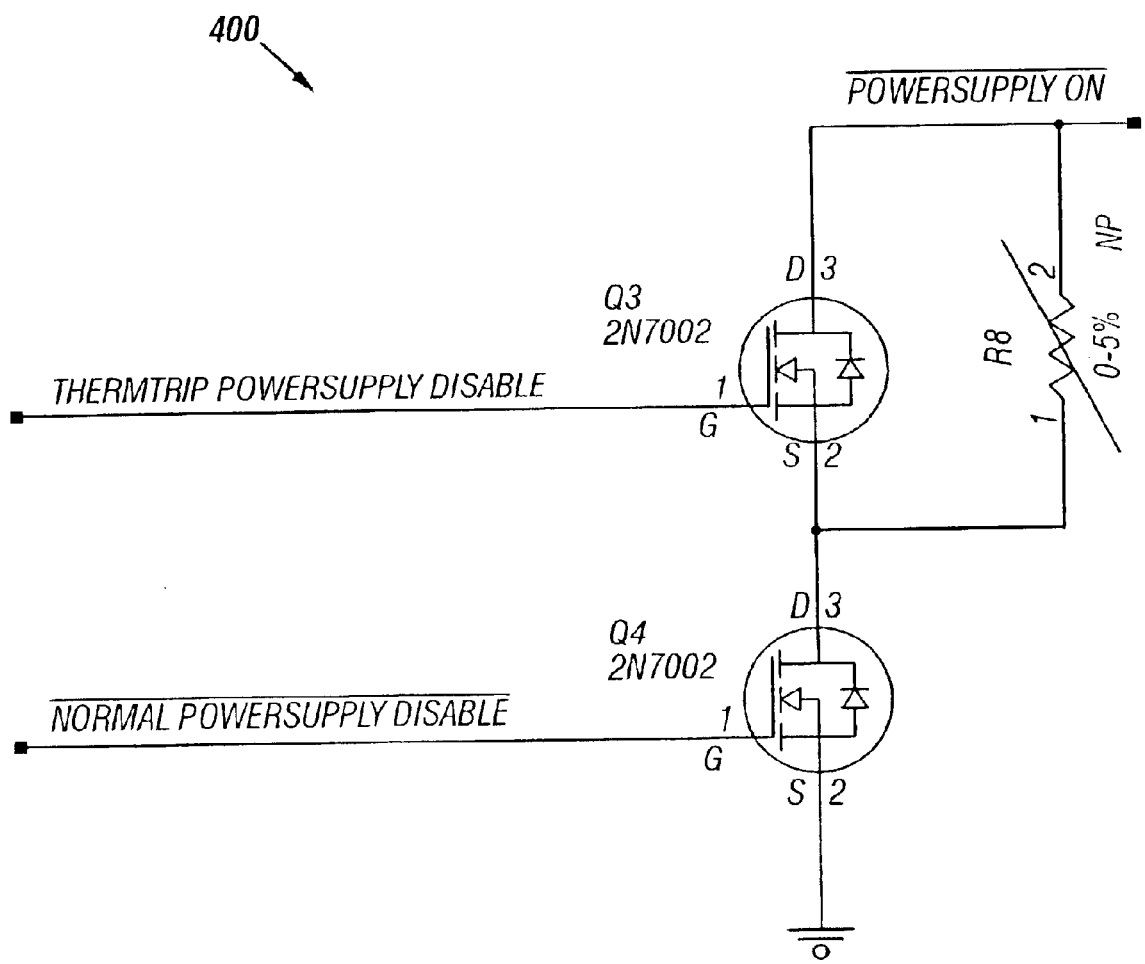
FIG. 4 is a circuit diagram of a power control circuit according to at least one embodiment.

Referring now to FIG. 4, the power control circuit 400 is seen to include a first semiconductor switch Q4 coupled in series with a second semiconductor switch Q5 between the $PS_{ON}$ node and GND. Q3 source is connected to Q5 drain. Q5 drain is connected to GND. Q4 gate is coupled to the THERMTRIP_PS_DISABLE output of latch U1. Q5 gate is coupled $PS_{DIS}$ (active low) of the power supply. Accordingly, a conductive path will exist between $PS_{ON}$ and GND only when both THERMTRIP_PS_DIS and $PS_{DIS}$ are both inactive, that is, when both are at a logic level ONE. A detailed explanation of the operation of the thermal latch power control circuit 400 is provided immediately below.

System Running—Normal Operation

During normal operation, the thermal latch power control circuit 400 is transparent to normal system operation. The THERMTRIP_POWERSUPPLY_DISABLE signal from flip-flop (U1) is high. This closes the path through Q3 to Q4. Thus, the POWERSUPPLY_ON# signal is controlled by Q4 from the ICH power supply control signal (NORMAL_POWERSUPPLY_DISABLE).

System Running—Thermal Overload Occurs

When the system is running, and a CPU thermal overload (overheat) occurs, the THERMTRIP# signal will go low. The level shift circuit will generate a 3.3 v version of THERMTRIP#. This is inverted to make the THERMTRIP 3.3 signal. Since the system is up and running, the signal passes through the isolation switch (since POWERGOOD is high). This causes a rising edge on the clock input of the flip-flop U1 (FIG. 1) to clock the data at the D input (tied high). This causes the Q# of U1 output to go the THERMAL TRIP LTCH POWER SUPPLY POWER CONTROL switch Q3 (FIG. 3). This causes the switch to open. The POWERSUPPLY_ON# signal goes high due to a pull-up resistor in the power supply. When this signal goes high, the power supply turns off, shutting down the system.

System Off, Switched On

When the system is off, and a THERMTRIP# has not occurred (i.e., the system was not shut off due to a thermal condition). The system is powered on by pressing the power button.

When this occurs the SIGNAL ISOLATION switch Q2 (FIG. 1) prevents the invalid signals from reaching the flip-flop and causing a false THERMTRIP condition at the output. This would cause the system to immediately power off. This would prevent the system from starting, locking it in the OFF state.

The isolation switch is needed because of the different voltages that are used for the CPU and the main and stand-by voltage powered devices. When the CPU is off (system powered down) the main and the 1.5 v supplies are powered off. Since the THERMTRIP logic must be active when the system is plugged into the power-outlet, the logic operates from the stand-by supply (AUX). Therefore, since only part of the THERMTRIP logic is powered, and the other voltage rails are powering up, the outputs of this logic are undefined. Thus, the signals powered by the CPU and main supplies must be isolated to prevent the false tripping of the flip-flop mentioned above.

System Off-Due to Thermal Overheat

When the system is off due to a thermal overheat condition of the CPU, the system is turned off as described in the "SYSTEM RUNNING-THERMAL OVERLOAD Occurs" section above.

After a shutdown due to a thermal condition, the system is restarted by user intervention. The user presses the power button, which clears thermal latch of the flip-flop. This causes the Q# signal of the flip-flop U1 (FIG. 1) to reset. This drafts the gate of the Q3 (FIG. 2) transistor, which closes the path of POWERSUPPLY_ON#. This allows Q4 (FIG. 2) to pull this signal low (as driven by the ICH) to turn on the system.

This implementation also allows the removal of part or all of this circuit, depending on system features and design requirements.

Resistors R5 (FIG. 3) and R8 (FIG. 4) can be used for this purpose. These resistors act as jumpers to bypass the latch and power control. By removing all components and populating these two resistors, the thermtrip and power control can be removed from the board, without affecting system function. This reduces component count and board cost if the feature is not needed.

Although the present disclosure has been described in connection with several embodiments, the disclosure is not intended to be limited to the specific forms set forth herein, but on the contrary, it is intended to cover such alternatives, modifications, and equivalents as can be reasonably included with in the spirit and scope of the disclosure as defined by the appended claims.

What is claimed is:

1. An information handling system comprising:
    a processor having a THERMTRIP output;
    a power supply coupled to the processor for operating the processor; and
    a thermal trip power control circuit comprising:
    a latch having a CLK input coupled to the THERMTRIP output of the processor and CLR input coupled to a user-activated control; and
    a gate having an input coupled to the output of the latch and an output coupled to a $PS_{ON}$ input of the power supply.

2. The information handling system as defined in claim 1, further comprising:
    signal conditioning means coupled between the THERMTRIP output of the processor and the CLK input of the latch for conditioning a processor THERMTRIP signal so that an overheating condition of the processor causes a transition at the CLK input of the latch.

3. The information handling system as defined in claim 2, wherein the signal conditioning means comprises:
    a level shifter having an input coupled to the THERMTRIP output of the processor; and
    an inverter coupled to an output of the level shifter.

4. The information handling system as defined in claim 3, wherein the signal conditioning means is operable to cause a negative-going transition in the THERMTRIP signal to result in a positive-going transition at the CLK input of the latch.

5. The information handling system as defined in claim 4, further comprising:
an isolation switch coupled between the signal conditioning means and the CLK input of the latch, the isolation switch operable to selectively couple the THERMTRIP signal to the CLK input of the latch.

6. The information handling system as defined in claim 5, wherein the isolation switch is operable to couple THERMTRIP signal to the CLK input of the latch when a PS signal is asserted and to isolate the THERMTRIP signal from the CLK input of the latch when the $PS_G$ signal CLK is not asserted.

7. The information handling system as defined in claim 6, wherein the isolation switch has an input node coupled to the signal conditioning means, an output node coupled to the CLK input of the latch, and a control node coupled to the $PS_G$ signal.

8. The information handling system as defined in claim 7, wherein the isolation switch comprises an FET.

9. The information handling system as defined in claim 1, further comprising:
an isolation switch coupled between the THERMTRIP output of the processor and the CLK input of the latch, the isolation circuit operable to selectively couple the THERMTRIP signal to the CLK input of the latch in response to the $PS_G$ signal.

10. The information handling system as defined in claim 9, further comprising a signal conditioner that comprises:
a level shifter having an input coupled to the THERMTRIP output of the processor; and
an output of the level shifter and an output coupled to the isolation circuit.

11. The information handling system as defined in claim 10, wherein the signal conditioner is operable to cause a negative-going transition in the THERMTRIP signal to result in a positive-going transition in the THERMTRIP signal at the isolation circuit.

12. The information handling system as defined in claim 10, wherein the isolation switch is operable to couple THERMTRIP signal to the CLK input of the latch when a PS signal is asserted and to isolate the THERMTRIP signal from the CLK input of the latch when the $PS_G$ signal CLK is not asserted.

13. The information handling system as defined in claim 12, wherein the isolation switch has an input node coupled to the signal conditioning means, an output node coupled to the CLK input of the latch, and a control node coupled to the $PS_G$ signal.

14. The information handling system as defined in claim 1, wherein the CLK input of the latch is coupled to the processor.

15. The information handling system as defined in claim 14, wherein the CLK input of the latch is coupled to the processor through an isolation circuit.

16. The information handling system as defined in claim 15, wherein the isolation circuit operates to prevent the latch from changing state until the power supply is demonstrated to be properly operating.

17. The information handling system as defined in claim 16, wherein the isolation circuit comprises a semiconductor switching device having an input node coupled to the processor, and output node coupled to the CLK input of the latch and a control node coupled to the power supply.

18. In an information handling system comprising a processor and a power supply, a method of controlling the power supply in response to an overheating condition of the processor, the method comprising:
receiving a THERMTRIP signal from the processor, the THERMTRIP signal indicative of a processor overheating condition; and
coupling the THERMTRIP signal to a latch circuit so that the latch circuit provides at an output a THERMTRIP_$PS_{DIS}$ signal to the power supply so as to disable the power supply.

19. The method as defined in claim 18, wherein the THERMTRIP signal is coupled to the latch circuit through an isolation switch so that invalid signals are isolated from the latch circuit.

20. The method as defined in claim 19, wherein the isolation switch has an input node coupled to the THERMTRIP signal, and output node coupled to the latch, and a control node coupled to a $PS_G$ signal.

21. The method as defined in claim 20, wherein the isolation circuit comprises an FET.

22. The method as defined in claim 18, wherein the THERMTRIP signal is coupled to the latch circuit through a signal conditioner.

23. The method as defined in claim 22, wherein the signal conditioner comprises:
a level shifter having an input coupled to the THERMTRIP output of the processor; and
an inverter coupled to the output of the level shifter.

24. The method as defined in claim 23, wherein the signal conditioner is operable to cause a negative-going transition in the THERMTRIP signal to result in a positive-going transition at a CLK input of the latch.

25. The method as defined in claim 24, further comprising:
an isolation switch coupled between the signal conditioner and the CLK input of the latch, the isolation switch operable to selectively couple the THERMTRIP signal to the CLK input of the latch.

26. The method as defined in claim 25, wherein the isolation switch is operable to couple THERMTRIP signal to the CLK input of the latch when a $PS_G$ signal is asserted and to isolate the THERMTRIP signal from the CLK input of the latch when the $PS_G$ signal CLK is not asserted.

27. The method as defined in claim 26, wherein the isolation switch has an input node coupled to the signal conditioner, an output node coupled to the CLK input of the latch, and a control node coupled to the $PS_G$ signal.

28. The method as defined in claim 18, wherein a transition in the received THERMTRIP signal causes a transition in a CLK input of the latch so that the latch provides a THERMTRIP_$PS_{DIS}$ signal to the power supply so as to disable the power supply.

29. The method as defined in claim 18, further comprising:
coupling a user-activated signal to a CLR input of the latch so as to CLR the THERMTRIP_$PS_{DIS}$ signal and thereby enable the power supply.

30. The method as defined in claim 29, wherein the user-activated signal is a $PS_{ON}$ signal from an information handling system PWR button.

31. The method as defined in claim 18, wherein the THERMTRIP_$PS_{DIS}$ is coupled to a first input of a logic circuit, the logic circuit having an output coupled to the $PS_{ON}$ input of the power supply so that the power supply is disabled whenever the THERMTRIP_$PS_{DIS}$ signal is asserted.

32. The method as defined in claim 31, further comprising:

coupling a $PS_{DIS}$ signal to a second input of the logic circuit so that the power supply is disabled whenever the $PS_{DIS}$ signal is asserted.

33. A thermal trip power control circuit comprising:

a latch having a CLK input coupled to a THERMTRIP output of a processor and CLR input coupled to a user-activated control; and a gate having an input coupled to the output of the latch and an output coupled to a $PS_{ON}$ input of a power supply.

34. The thermal trip power control circuit as defined in claim 33, further comprising:

signal conditioning means coupled between the THERMTRIP output and the CLK input of the latch for conditioning a processor THERMTRIP signal so that an overheating condition of the processor causes a transition at the CLK input of the latch.

35. The thermal trip power control circuit as defined in claim 34, wherein the signal conditioning means comprises:

a level shifter having an input coupled to the THERMTRIP output; and an inverter coupled to an output of the level shifter.

36. The thermal trip power control circuit as defined in claim 35, wherein the signal conditioning means is operable to cause a negative-going transition in the THERMTRIP signal to result in a positive-going transition at the CLK input of the latch.

37. The thermal trip power control circuit as defined in claim 36, further comprising:

an isolation switch coupled between the signal conditioning means and the CLK input of the latch, the isolation switch operable to selectively couple the THERMTRIP signal to the CLK input of the latch.

38. The thermal trip power control circuit as defined in claim 37, wherein the isolation switch is operable to couple THERMTRIP signal to the CLK input of the latch when a PS signal is asserted and to isolate the THERMTRIP signal from the CLK input of the latch when the $PS_G$ signal CLK is not asserted.

39. The thermal trip power control circuit as defined in claim 38, wherein the isolation switch has an input node coupled to the signal conditioning means, an output node coupled to the CLK input of the latch, and a control node coupled to the $PS_G$ signal.

40. The thermal trip power control circuit as defined in claim 39, wherein the isolation switch comprises an FET.

41. The thermal trip power control circuit as defined in claim 33, further comprising:

an isolation switch coupled between the THERMTRIP output of the processor and the CLK input of the latch, the isolation circuit operable to selectively couple the THERMTRIP signal to the CLK input of the latch in response to the $PS_G$ signal.

42. The thermal trip power control circuit as defined in claim 41, further comprising a signal conditioner that comprises:

a level shifter having an input coupled to the THERMTRIP output of the processor; and an output of the level shifter and an output coupled to the isolation circuit.

43. The thermal trip power control circuit as defined in claim 42, wherein the signal conditioner is operable to cause a negative-going transition in the THERMTRIP signal to result in a positive-going transition in the THERMTRIP signal at the isolation circuit.

44. The thermal trip power control circuit as defined in claim 42, wherein the isolation switch is operable to couple THERMTRIP signal to the CLK input of the latch when a PS signal is asserted and to isolate the THERMTRIP signal from the CLK input of the latch when the $PS_G$ signal CLK is not asserted.

45. The thermal trip power control circuit as defined in claim 44, wherein the isolation switch has an input node coupled to the signal conditioning means, an output node coupled to the CLK input of the latch, and a control node coupled to the $PS_G$ signal.

46. The thermal trip power control circuit as defined in claim 33, wherein the CLK input of the latch is coupled to the processor.

47. The thermal trip power control circuit as defined in claim 46, wherein the CLK input of the latch is coupled to the processor through an isolation circuit.

48. The thermal trip power control circuit as defined in claim 47, wherein the isolation circuit operates to prevent the latch from changing state until the power supply is demonstrated to be property operating.

49. The thermal trip power control circuit as defined in claim 48, wherein the isolation circuit comprises a semiconductor switching device having an input node coupled to the processor, and output node coupled to the CLK input of the latch and a control node coupled to the power supply.

* * * * *